(12) United States Patent
Bucknell

(10) Patent No.: US 9,816,614 B2
(45) Date of Patent: Nov. 14, 2017

(54) SEALS FOR HYDRAULIC ASSEMBLIES

(75) Inventor: John Wentworth Bucknell, Indooroopilly (AU)

(73) Assignee: John Wentworth Bucknell (AU)

(*) Notice: Subject to any disclaimer, the term of this patent is extended or adjusted under 35 U.S.C. 154(b) by 0 days.

(21) Appl. No.: 13/546,298

(22) Filed: Jul. 11, 2012

(65) Prior Publication Data

US 2013/0220450 A1 Aug. 29, 2013

Related U.S. Application Data

(63) Continuation of application No. 10/598,363, filed on Jul. 15, 2008, now abandoned.

(51) Int. Cl.
*F16J 15/02* (2006.01)
*F16J 15/3236* (2016.01)
*F16J 15/3212* (2016.01)
*B25B 29/02* (2006.01)
*F16B 31/04* (2006.01)

(52) U.S. Cl.
CPC ............. *F16J 15/028* (2013.01); *B25B 29/02* (2013.01); *F16J 15/3212* (2013.01); *F16J 15/3236* (2013.01); *F16B 31/043* (2013.01); *Y10T 137/7722* (2015.04)

(58) Field of Classification Search
CPC .. F16J 15/3236; F16J 15/3208; F16J 15/3212; F16J 15/028; F16B 31/043; B25B 29/02; Y10T 137/7722
USPC ......... 251/62, 63, 63.4, 63.5, 63.6; 277/587, 277/553, 557, 558, 567, 530, 529, 508
See application file for complete search history.

(56) References Cited

U.S. PATENT DOCUMENTS

| | | | | | |
|---|---|---|---|---|---|
| 2,360,731 | A | * | 10/1944 | Smith | 277/453 |
| 2,401,379 | A | * | 6/1946 | Smith | 277/587 |
| 2,467,099 | A | * | 4/1949 | Smith | 384/484 |
| 2,817,361 | A | * | 12/1957 | Mercier | 138/31 |
| 3,094,904 | A | * | 6/1963 | Healy | 92/241 |
| 3,146,683 | A | * | 9/1964 | Hoffmann | 92/155 |
| 3,326,560 | A | * | 6/1967 | Trbovich | 277/382 |
| 3,342,500 | A | * | 9/1967 | Knudson | 277/530 |
| 3,367,666 | A | * | 2/1968 | Symons | 277/371 |
| 3,381,970 | A | * | 5/1968 | Brown | F16J 15/166 277/532 |
| 3,953,213 | A | * | 4/1976 | Gasper | 277/438 |
| 4,018,417 | A | * | 4/1977 | Hanson | 251/63.5 |

(Continued)

FOREIGN PATENT DOCUMENTS

| | | | |
|---|---|---|---|
| GB | 581593 A | * | 10/1946 |
| GB | 907542 | | 10/1962 |

*Primary Examiner* — Mary McManmon
*Assistant Examiner* — David Colon Morales
(74) *Attorney, Agent, or Firm* — Dureska & Moore, LLC; David P. Dureska; Brent L. Moore

(57) ABSTRACT

A sealing device for a hydraulic assembly wherein hydraulic fluid is contained in working chamber (53) formed between body (52) and thrust member (51) of the assembly. The device comprises annular seal (63) with opposed sealing faces which are urged into sealing engagement between body (52) and thrust member (51) which have convergent sealing faces. The device may also have a pressure relief valve (100) tapped into the over-stroke end of chamber (53) to protect seal (63) from over-stroke damage comprising porous body (101) which allows fluid to bleed from chamber (53) and allows seal (63) to pass the tapping point without obstruction.

16 Claims, 7 Drawing Sheets

(56) References Cited

U.S. PATENT DOCUMENTS

| | | | | |
|---|---|---|---|---|
| 4,254,839 A * | 3/1981 | Schpok | ................ | E21B 10/246 |
| | | | | 175/228 |
| 4,392,657 A * | 7/1983 | Roley | ........................... | 277/383 |
| 4,410,189 A * | 10/1983 | Myers et al. | ................. | 277/530 |
| 4,489,953 A * | 12/1984 | Witt | ...................... | F16J 15/065 |
| | | | | 277/584 |
| 4,527,806 A * | 7/1985 | Ungchusri et al. | ........... | 277/530 |
| 4,618,154 A * | 10/1986 | Freudenthal | .................. | 277/556 |
| 4,651,764 A * | 3/1987 | Miller et al. | ................. | 137/81.1 |
| 4,759,265 A * | 7/1988 | Stoll et al. | ....................... | 92/153 |
| 4,781,024 A * | 11/1988 | Nakamura | ...................... | 60/533 |
| 5,046,906 A * | 9/1991 | Bucknell | ....................... | 411/432 |
| 5,140,904 A * | 8/1992 | Schonlau | .......................... | 92/27 |
| 5,349,894 A * | 9/1994 | Greer | ............................... | 91/43 |
| 5,354,072 A * | 10/1994 | Nicholson | ..................... | 277/647 |
| 5,630,591 A * | 5/1997 | Drijver et al. | ................. | 277/553 |
| 5,799,953 A * | 9/1998 | Henderson | .................... | 277/554 |
| 5,984,316 A * | 11/1999 | Balsells | ........................ | 277/553 |
| 5,996,472 A * | 12/1999 | Nguyen et al. | ................. | 92/245 |
| 6,305,265 B1 * | 10/2001 | Bingham et al. | .............. | 92/168 |
| 6,402,466 B1 * | 6/2002 | Burdgick | ................. | F01D 9/04 |
| | | | | 277/630 |
| 6,419,236 B1 * | 7/2002 | Janian | ........................... | 277/553 |
| 6,494,465 B1 * | 12/2002 | Bucknell | ....................... | 277/641 |
| 6,923,215 B2 * | 8/2005 | Weber | ............................ | 138/31 |
| 2005/0023769 A1 * | 2/2005 | Halling | ......................... | 277/602 |
| 2005/0186050 A1 * | 8/2005 | Britton et al. | ................ | 411/434 |

* cited by examiner

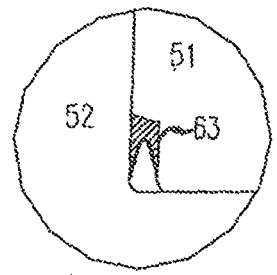
FIG. 2A
*PRIOR ART*
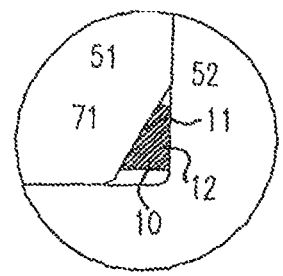
FIG. 2C
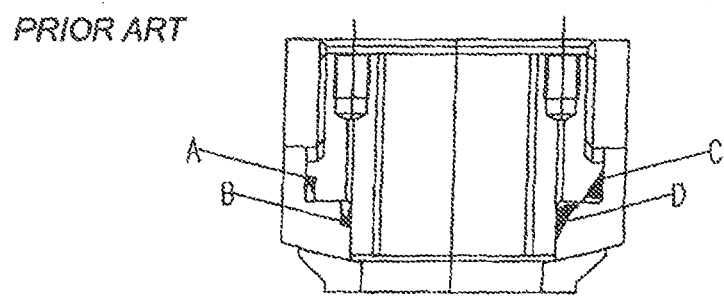
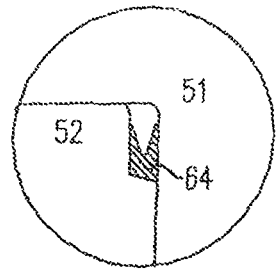
FIG. 2B
*PRIOR ART*
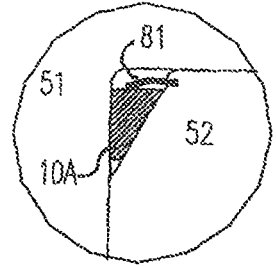
FIG. 2D

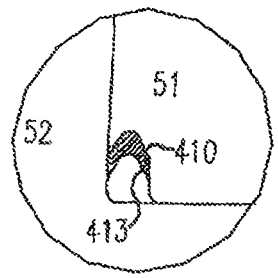
FIG. 2E
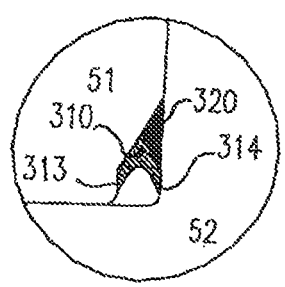
FIG. 2G
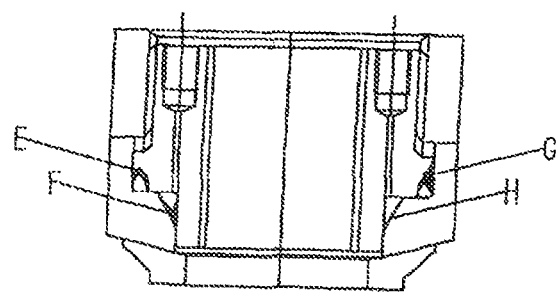
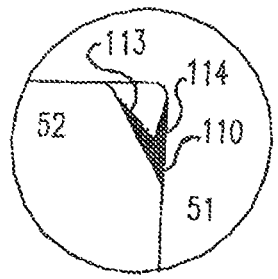
FIG. 2F
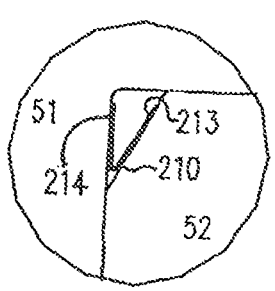
FIG. 2H

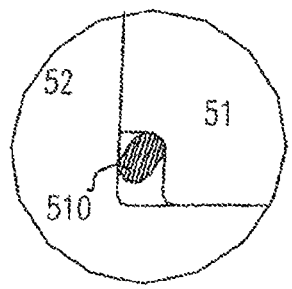
FIG. 2J
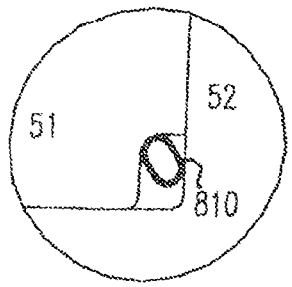
FIG. 2L
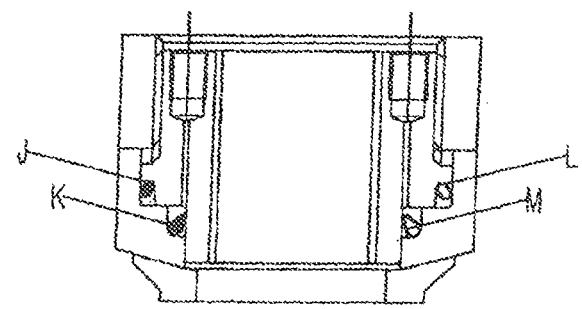
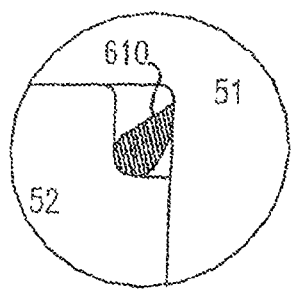
FIG. 2K
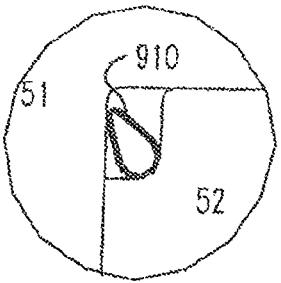
FIG. 2M

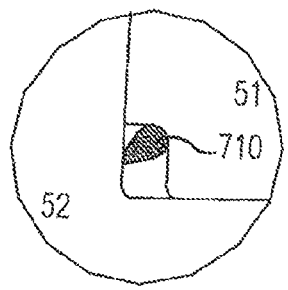
FIG. 2N
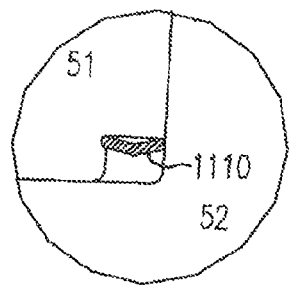
FIG. 2P
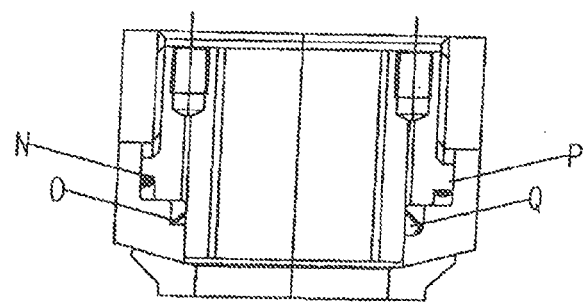
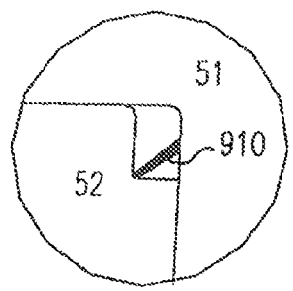
FIG. 2O
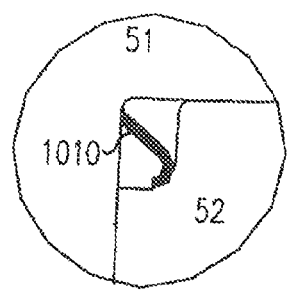
FIG. 2Q

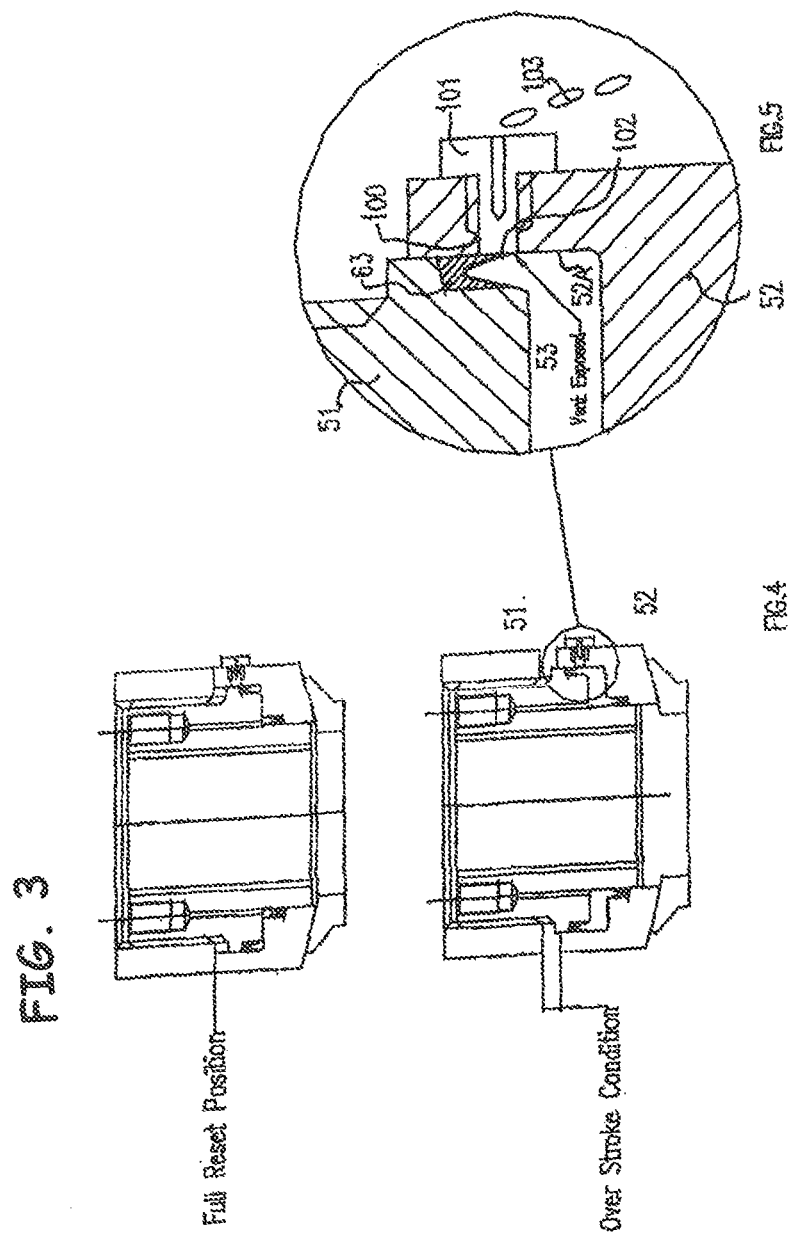

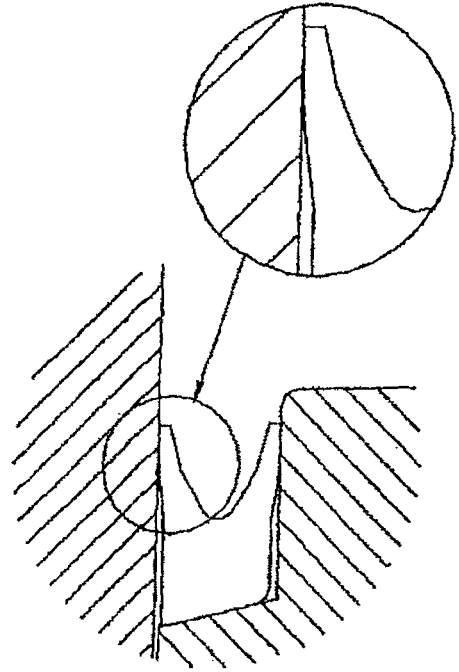
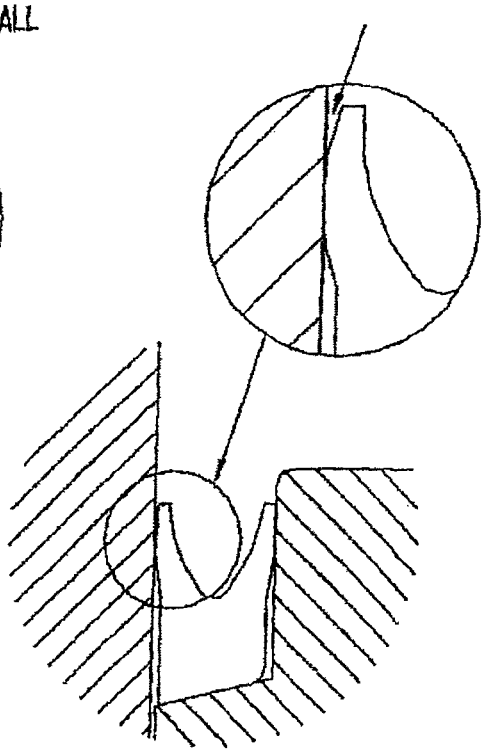
FIG. 6.
Prior Art
FIG. 7.
Prior Art
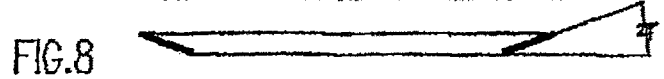
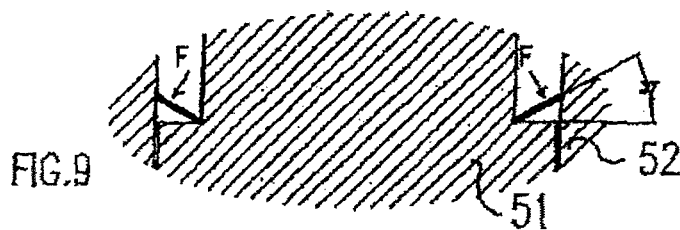

SEALS FOR HYDRAULIC ASSEMBLIES

CROSS-REFERENCE TO RELATED APPLICATIONS

This application is a continuation of U.S. patent application Ser. No. 10/598,363, filed on Jul. 15, 2008, which is hereby incorporated by reference and which claims the benefit of PCT Application Serial No. PCT/AU2005/000253, filed Feb. 25, 2005, and Australian Patent Application Serial No. 2004900922, filed Feb. 25, 2004.

FIELD OF INVENTION

This invention relates to high temperature seals for hydraulic assemblies and in particular seals which are suitable for hydraulic fasteners and nuts.

BACKGROUND OF THE INVENTION

Hydraulically tensioned nuts, washers and similar fasteners provide a means by which a stud or bolt can be tensioned by hydraulically actuating the nut or washer to exert a tensile force on the stud or bolt. These nuts and washers often operate under extreme pressure and temperature.

Hydraulic nuts or similar fasteners are typically pretensioned mechanically and thereafter hydraulic pressure is applied to a chamber within the fastened structure to generate an hydraulic force which applies an axial tensile load to a stud or nut engaged by the fastener. A locking collar may be provided to retain the tension after relieving the chamber of pressure.

Seals for use with hydraulic pressure devices are typically made of elastomeric material such as nitrile rubber or polyurethane. The ways in which these seal against the passage of fluid pressure can be divided into two types referred to herein as primary and secondary mechanisms. The primary mechanism of sealing acts during the initial application of fluid pressure. As this pressure increases, the elastomeric seal is deformed and forced into a position where the seal bridges the gap to be sealed, hereinafter referred to as the "extrusion gap", in order to establish a secondary seal.

It is typical of hydraulically activated piston/cylinder arrangements that as the operating pressure increases, the cylinder walls expand radially causing a proportional increase in the extrusion gap between piston and cylinder. A limiting factor in the operation of hydraulic nuts is the effectiveness of their seals. Factors such as high pressures, high temperatures, service life under adverse conditions, limit their field of application and effectiveness. If these factors become extreme, either singularly or in combination, the materials which are commonly used as sealing agents fail. Failure occurs when there is flow or movement of the seal material into the extrusion gap under pressure and/or temperature and sealing is lost.

In extreme temperature/pressure applications, such as in electricity generators and nuclear power plant reactors, it is critical that seals do not fail as loss of tension applied to the studs or bolts for example in a generator housing or at a pipe flange joint, as such failure could result in a catastrophic disaster. U.S. Pat. No. 6,494,465 (Bucknell) (=International Application PCT/AU97/00425=International Publication WO 98/00660) discloses a range of hydraulic seals for hydraulic assemblies capable of operating at high temperatures. The seals incorporate lips which provide low pressure sealing between for example, a piston and a cylinder, and which are configured to move across the gap to be sealed at higher pressures with a base angled on a slope or a cup shape nestled into a groove. The seals may be formed of elastomeric material and/or thin sheet metal.

The seals of U.S. Pat. No. 6,494,465 have been used in many successful installations of high temperature, hydraulically tensioned fasteners in the electricity generation and nuclear power industries. However, experience has shown that there is a need for different types of sealing arrangements for fasteners, especially in response to specific operational requirements.

It is therefore an object of the present invention to provide high temperature seals for hydraulic assemblies such as fasteners which have improved sealing characteristics able to tolerate extreme factors such as high pressures and/or high temperatures. It is a further object of the invention to provide seals which achieve a greater extended service life under such adverse conditions or at least provide an alternative to prior art seals.

SUMMARY OF THE INVENTION

According to the present invention, a sealing device for an hydraulic assembly wherein hydraulic fluid is contained in a working chamber formed between the body and the thrust member of the assembly comprises an annular seal with opposed sealing faces which are urged into sealing engagement between the body and the thrust member which have convergent sealing faces.

Preferably the device also comprises an annular mating spring clip retained in the body or in the thrust member of the assembly which bears against a non-sealing face of the annular seal to ensure primary sealing engagement between the body and the thrust member.

Preferably the annular seal is formed with a pair of annular sealing lips which are urged into sealing engagement between the body and the thrust member of the assembly at an initial low pressure, the remainder of the seal being urged into sealing engagement at higher pressures.

Preferably the seal is elastically deformed when it is placed in position so that it springs towards its original shape thus urging sealing engagement between the body and the thrust member.

Preferably the seal has a rounded heel which rolls under pressure to maintain sealing engagement.

In an alternative form the sealing device is provided with a pressure relief valve tapped into the over-stroke end of the chamber to protect the annular seal from over-stroke damage comprising a porous body which allows hydraulic fluid to bleed from the chamber and which allows the annular seal to pass the tapping point without obstruction.

Preferably the porous body is formed from sintered metal or porous ceramics.

BRIEF DESCRIPTION OF THE DRAWINGS

To enable the invention to be fully understood, preferred embodiments will now be described with reference to the accompanying drawings, in which:

FIGS. 2A and 2B are cross sections of prior art seals;

FIGS. 2C to 2Q are cross sections of seals in accordance with the present invention;

FIG. 3 is a sectioned view of an hydraulic nut in the full reset position' fitted with the pressure relief device of the present invention;

FIG. 4 is a sectioned view showing the nut of FIG. 3 in the over-straight condition;

FIG. 5 is an enlarged view of part of the nut of FIG. 4;

FIGS. 6 and 7 are cross sections of distorted prior art seal lips; and

FIGS. 8 and 9 are cross sections of seals of FIGS. 2F to 2Q.

DETAILED DESCRIPTION OF THE INVENTION

Figure 2:
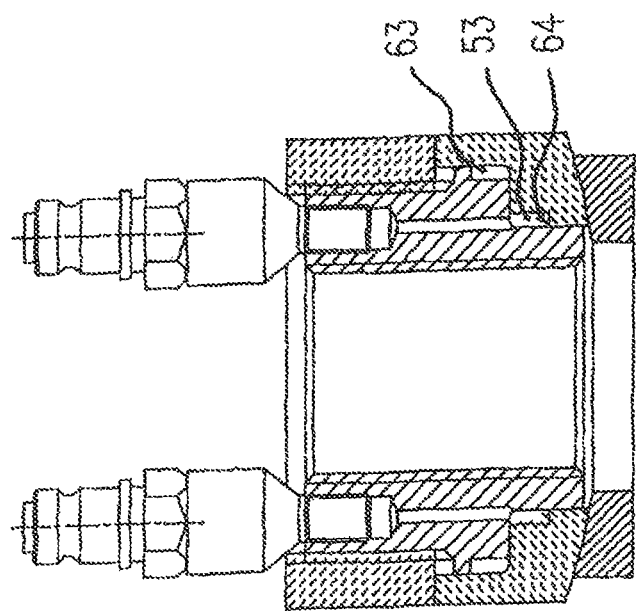
FIG. 2 is a sectioned view of the assembled hydraulic nut assembly of FIG. 1.
Figure 1:
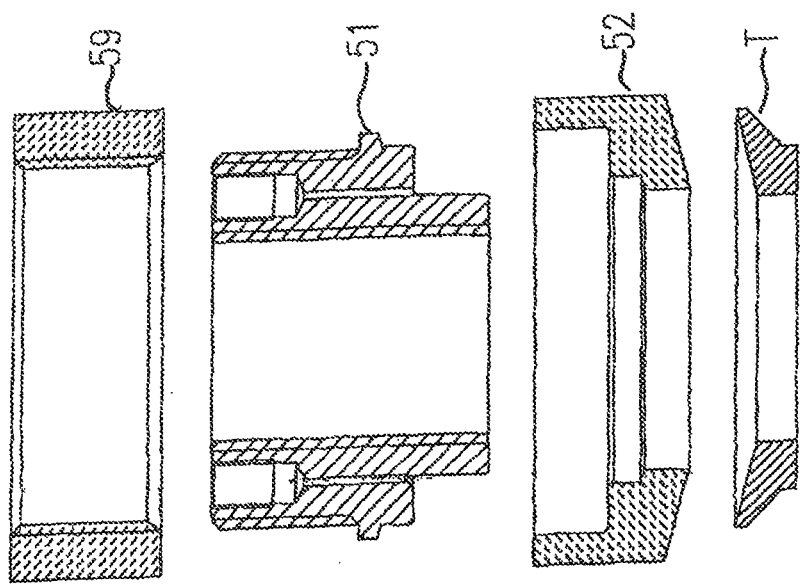
FIG. 1 is a sectioned view of the components of an hydraulically assisted nut.

FIGS. 1 and 2 illustrate the components and assembly respectively of the prior art hydraulically assisted nut disclosed in U.S. Pat. No. 6,494,465, including a piston 51, cylinder 52, locking ring 59, thrust washer 50 and a hydraulic working chamber 53. Seals 63, 64 are provided in closed working chamber 53 between piston 51 and cylinder 52 in the manner described in U.S. Pat. No. 6,494,465.

FIGS. 2A and 2B illustrate the generally V shaped prior art seals 63, 64. FIG. 2C shows an interference seal 10 in accordance with the present invention, which is responsive to a slow injection of an hydraulic medium of low viscosity. It offers greater mobility than prior art seals 63, 64 as it has a greater angle as seal 10 is driven by pressure. There is a slight difference in angle between face 11 of seal 10 and face 71 of piston 51 which ensures that the thicker part of body 12 of seal 10 is driven against face 71 of piston 51 and cylinder 52. This seal construction is effective in applications not requiring a slow pressure charging routine.

FIG. 2D illustrates a similar construction where spring clip 81 on cylinder 52 ensures that primary sealing contact is made with the sealing faces. FIG. 2F is like the prior art designs of FIGS. 2A and 2B and has thin seal lips 113, 114 to receive an initial lower pressure and therefore produces two phases of sealing. FIG. 2H shows seal 210 with seal lips 213, 214, which operate on the same principles but which can be pressed from sheet metal.

Seals 110, 210 and 310 of FIGS. 2F, 2H and 2G, respectively are formed in shapes which ensure that a spring force is applied to the seals lips 113, 114, 213, 214, 313, 314 to provide primary sealing when seals 110, 210 and 310 are inserted in the working position. The secondary sealing action is activated by increasing the charge pressure. Seal 310 of FIG. 2G combines initial low pressure sealing of lips 313, 314 with a double ramp to force backup ring 320 to do most of the sealing work. In this arrangement, the seal function becomes more like that of a "V-packing" where multiple lips share the work.

FIG. 2E illustrates seal 410 in which lip 413 in contact with the wall of piston 510 does virtually all the work of sealing. Seal 410 is made larger than the limiting dimensions of the seal groove and piston wall so that when it is fitted, it has a residual spring force to drive it against the wall. The lip 413 of seal 410 is allowed to flex and follow the expansion of cylinder 52 caused by the increasing charge pressure. Seal 410 is best used with relatively low pressures and minimum radial wall deflection.

The seals shown in FIGS. 2J to 2Q are of a quite different construction in that they are spring loaded on installation so that primary sealing is effected by the seal's attempt to return to its original shape. This is illustrated in FIGS. 8 and 9 where the seal which is made in the shape shown in FIG. 8 is inserted into position shown in FIG. 9 so that it is forced inwards by the seal groove, and will therefore be forced against the adjacent outer cylinder walls.

The primary forces are selected to suit the conditions and the seals are made from material of the required elasticity so that they deform when inserted to the shape required. The seals shown in FIGS. 2J to 2Q all use this spring loading principle to achieve primary sealing. This sealing action is then reinforced by the increasing internal pressure in cylinder 52. The sealing force exerted against the wall is determined by the area of the seal which responds proportionately to the injected pressure.

Deformation of thin sections of seal elements under the effects of pressure and temperature decreases and often destroys the seal's integrity. Prior art seals with thin lips as shown in FIGS. 2A and 2B are required to maintain some spring pressure against the cylinder walls at all times. This means that a material of sufficient yield strength is selected so that the seal does not deform plastically in regions of high local stress. If the material strength is not sufficient permanent deformation can occur. This tends to happen progressively from thinner section to a point where there is sufficient thickness to balance the destructive force, so that when the seal lip is deformed in this manner, it can curl back from contact with the cylinder wall.

Increasing temperatures lower the effective strength of most materials and particularly that of engineering steels and a metal seal which is deformed in use will be difficult to return to service. Medium under pressure forces into the gap created at the thin edge and acts as a wedge to force the lower sections away from sealed contact with the cylinder walls. This problem with known seals is illustrated in FIGS. 6 and 7.

The innovative design of the "seal ring" seals of FIGS. 2J to 2Q solves this problem by the action of the charging fluid's pressure upon the opposed surface of the seal, which generates thrust forces to aid sealing on the critical faces. Such force is directly related to incremental pressure, and therefore, maintains the relationship required for sealing throughout the range. The problem of heat affecting thin sections and causing permanent deformations is resolved by the new designs having thick sectional areas.

Seals 510, 610 and 710 exhibiting these characteristics are illustrated in FIGS. 2J, 2K and 2N. Seals 810 and 910 illustrated in FIGS. 2L and 2M show hollow versions of the seals 510 and 610 of FIGS. 2J and 2K, but generally would have limited application in practice. Seals 910, 1010 of FIGS. 2O and 2Q show how the principles of the "spring ring" can be applied to thinner sections of materials. These can be made inexpensively and are generally sufficient for hydraulically assisted nut fasteners used at lower operating pressures. Seal 110 or FIG. 2P illustrates a version of the seal which can be made in a chevron form wherein the pressure will act to expand the seal's outer diameter and provide sealing against the wall of cylinder 52.

It will be readily apparent to the skilled addressee that the selection of the material for the seals, the particular shape, size and configuration of the seals, will be dependent on the intended applications. Factors which will be significant in selecting the appropriate seal will include the operating temperatures and pressures of the hydraulic assemblies and the type and pressure of the charging medium.

A further factor which destroys seal integrity is overstroke, that is, during attempted operation, the seal travels beyond its practical working limit, resulting in failure and a dangerous burst release of high pressure fluid. To prevent such failure, it is desirable to introduce a bleed-off port into the construction of the hydraulically assisted fastener nut.

Should the seal be forced to travel over its stroke limit, then this port minimises seal damage by allowing fluid to escape. However, the seal would be irreparably damaged even by its partial transit across the port since extreme internal pressures extrude the seal material as it passes, even scratching hardened steel surfaces.

FIG. 4 illustrate a bleed port 100 which accommodates a pressure relief device comprising a porous plug 101. The inner face 102 of the plug 101 is profiled to conform to the adjacent sealing wall face 52A so that seal 63 is not damaged as it moves over bleed port 100. The material of the porous plus plug 101 is chosen to have high strength to provide support to seal 63 as it moves over bleed port 100, and is porous to allow fluid 103 to migrate from pressure chamber 53 freely. As seal 63 moves across bleed port 100, more material of porous plug 101 is exposed and the bled rate is increased. The density and relative porosity of plug 101 is chosen to provide appropriate strength and bleed rate for the application. Low cost materials of choice for plug 101 are sintered metal and porous ceramics but other materials may be suitable.

It will be readily apparent to the skilled addressee that porous plug 101 of the pressure relief device will protect seal 63 against damage if it moves from the full reset position shown in FIG. 3 to the overstroke condition shown in FIG. 4. The porous bleed plug of the present invention can be applied to any hydraulic assembly where overstroke damage can occur to seals.

VARIATIONS

It will be realized that the foregoing has been given by way of illustrative example only and that all other modifications and variations as would be apparent to persons skilled in the art are deemed to fall within the broad scope and ambit of the invention as herein set forth. Throughout the description and claims to this specification the word "comprise" and variation of that word such as "comprises" and "comprising" are not intended to exclude other additives components integers or steps.

The invention claimed is:

1. A sealing device for an hydraulic assembly wherein the hydraulic assembly includes a body and a thrust member wherein hydraulic fluid is contained in a working chamber formed between the body and the thrust member of the assembly comprising an annular seal with opposed sealing faces which are urged into sealing engagement between the body and the thrust member which have convergent sealing faces and comprises an annular mating spring clip embedded into the body or into the thrust member of the assembly, said spring clip bearing against a non-sealing face of the annular seal and having a spring force opposing movement of said annular seal to ensure primary sealing engagement between the body and the thrust member, said hydraulic assembly includes a bleed port that accommodates a pressure relief device comprising a porous body.

2. The sealing device of claim 1, wherein said annular seal is generally V- or Y-shaped, with said opposed sealing faces on a pair of sealing lips of said annular seal, to ensure primary sealing engagement between the body and the thrust member.

3. The sealing device of claim 1 in which the annular seal is formed with a pair of annular sealing lips which are urged into sealing engagement between the body and the thrust member of the assembly at an initial low pressure, the remainder of the seal being urged into sealing engagement at higher pressures.

4. The sealing device of claim 1 in which the seal is spring loaded when it is placed in position so that it attempts to returns to its original shape thus urging sealing engagement between the body and the thrust member.

5. The sealing device of claim 1 in which the seal has a rounded heel which rolls under pressure to maintain sealing engagement.

6. The sealing device of claim 1, wherein the pressure relief device comprises a pressure relief valve tapped into the over-stroke end of the chamber to protect the annular seal from over-stroke damage comprising the porous body which allows hydraulic fluid to bleed from the chamber and which allows the annular seal to pass the tapping point without obstruction.

7. The sealing device of claim 6 wherein the porous body is formed from sintered metal or porous ceramics.

8. The sealing device of claim 1, wherein said spring clip includes a first portion and a second portion, only said first portion being embedded into said body or into said thrust member.

9. The sealing device of claim 1, wherein said annular seal is formed from pressed sheet metal.

10. A sealing device for an hydraulic assembly wherein the hydraulic assembly includes a body and a thrust member wherein hydraulic fluid is contained in a working chamber formed between the body and the thrust member of the assembly comprising an annular seal with opposed sealing faces which are urged into sealing engagement between the body and the thrust member which have convergent sealing faces, the annular seal being formed with a pair of annular sealing lips which are urged into sealing engagement between the body and the thrust member of the assembly at an initial low pressure, the remainder of the seal being urged into sealing engagement at higher pressures, and comprises an annular mating spring clip embedded into the body or into the thrust member of the assembly, said spring clip bearing against a non-sealing face of the annular seal and having a spring force opposing movement of said annular seal to ensure primary sealing engagement between the body and the thrust member, said hydraulic assembly includes a bleed port that accommodates a pressure relief device comprising a porous plug.

11. The sealing device of claim 10 in which the seal is spring loaded when it is placed in position so that it attempts to returns to its original shape thus urging sealing engagement between the body and the thrust member.

12. The sealing device of claim 10 in which the seal has a rounded heel which rolls under pressure to maintain sealing engagement.

13. A sealing device for an hydraulic assembly wherein the hydraulic assembly includes a body and a thrust member wherein hydraulic fluid is contained in a working chamber formed between the body and the thrust member of the assembly comprising an annular seal with opposed sealing faces which are urged into sealing engagement between the body and the thrust member which have convergent sealing faces, said sealing device being provided with a pressure relief valve tapped into the over-stroke end of the chamber to protect the annular seal from over-stroke damage comprising a porous body which allows hydraulic fluid to bleed from the chamber and which allows the annular seal to pass the tapping point without obstruction and comprises an annular mating spring clip embedded into the body or into the thrust member of the assembly, said spring clip bearing against a non-sealing face of the annular seal and having a spring force opposing movement of said annular seal to ensure primary sealing engagement between the body and the thrust member, said hydraulic assembly includes a bleed port that accommodates the pressure relief valve comprising the porous body.

14. The sealing device of claim 13 wherein the porous body is formed from sintered metal or porous ceramics.

15. A sealing device for an hydraulic assembly wherein the hydraulic assembly includes a body and a thrust member wherein hydraulic fluid is contained in a working chamber formed between the body and the thrust member of the assembly comprising an annular seal with opposed sealing faces which are urged into sealing engagement between the body and the thrust member which have convergent sealing faces and comprises an annular mating spring clip penetrating into the body or into the thrust member of the assembly, said spring clip bearing against a non-sealing face of the annular seal and having a spring force opposing movement of said annular seal to ensure primary sealing engagement between the body and the thrust member, said hydraulic assembly includes a bleed port that accommodates a pressure relief device comprising a porous plug.

16. The sealing device of claim 15, wherein said spring clip includes a first portion and a second portion, only said first portion penetrating into said body or into said thrust member.

* * * * *